United States Patent
Yu et al.

(10) Patent No.: US 12,265,099 B2
(45) Date of Patent: Apr. 1, 2025

(54) ROTATING DIRECTION AND ROTATING SPEED SENSING DEVICE

(71) Applicant: TAIGENE ELECTRIC MACHINERY CO., LTD., Taipei (TW)

(72) Inventors: Chin-Chieh Yu, Taipei (TW); Chun-Hsien Wu, Taipei (TW)

(73) Assignee: TAIGENE ELECTRIC MACHINERY CO., LTD., Taipei (TW)

( * ) Notice: Subject to any disclaimer, the term of this patent is extended or adjusted under 35 U.S.C. 154(b) by 0 days.

(21) Appl. No.: 18/449,486

(22) Filed: Aug. 14, 2023

(65) Prior Publication Data
US 2024/0377427 A1   Nov. 14, 2024

(30) Foreign Application Priority Data
May 8, 2023   (TW) .................. 112116944

(51) Int. Cl.
*G01P 3/481*   (2006.01)
*G01P 13/04*   (2006.01)

(52) U.S. Cl.
CPC ............ *G01P 3/481* (2013.01); *G01P 13/045* (2013.01)

(58) Field of Classification Search
CPC ............................ G01P 3/481; G01P 13/045
See application file for complete search history.

(56) References Cited

U.S. PATENT DOCUMENTS

| | | | |
|---|---|---|---|
| 7,872,470 B2 | 1/2011 | Booth et al. | |
| 10,598,739 B2 | 3/2020 | Shoemaker et al. | |
| 2008/0083168 A1* | 4/2008 | Booth | G01P 3/488 324/179 |
| 2016/0108842 A1* | 4/2016 | Mirassou | G01P 3/44 73/1.41 |
| 2017/0241812 A1* | 8/2017 | Grambichler | G01D 5/247 |
| 2018/0120179 A1* | 5/2018 | Hourne | G01L 3/105 |
| 2019/0072416 A1* | 3/2019 | Hainz | G01D 5/24457 |
| 2019/0383886 A1* | 12/2019 | Shoemaker | G01R 33/0047 |

FOREIGN PATENT DOCUMENTS

CN   115932314 A   4/2023

OTHER PUBLICATIONS

Search Report appended to an Office Action, which was issued to Taiwanese counterpart application No. 112116944 by the TIPO on Jan. 16, 2024, 2 pages with an English translation thereof.

* cited by examiner

*Primary Examiner* — Christopher P McAndrew
*Assistant Examiner* — Zannatul Ferdous
(74) *Attorney, Agent, or Firm* — HSML P.C.

(57) ABSTRACT

A rotating direction and rotating speed sensing device includes a tested unit, a housing, and a Hall effect sensor disposed in the housing. The tested unit includes an output shaft, and a toothed disk sleeved on and driven by the output shaft. The Hall effect sensor positionally corresponds to the toothed disk for detecting rotating direction and rotating speed, and includes three Hall effect sensing elements spaced apart along a first straight line, and a first pin and a second pin respectively outputting a first signal and a second signal when the toothed disk rotates. The first straight line cooperates with a tangential direction of the toothed disk to form an included angle that ranges in a predetermined angle range, such that a phase shift between the first signal and the second signal ranges from 45 degrees to 135 degrees when the toothed disk rotates.

5 Claims, 7 Drawing Sheets

ROTATING DIRECTION AND ROTATING SPEED SENSING DEVICE

CROSS-REFERENCE TO RELATED APPLICATION

This application claims priority to Taiwanese Invention patent application No. 112116944, filed on May 8, 2023.

FIELD

The disclosure relates to a sensing device, and more particularly to a rotating direction and rotating speed sensing device.

BACKGROUND

A conventional motor speed sensor assembly for detecting rotational direction and rotational speed of a rotor includes a housing, two Hall effect sensor modules that are mounted on the housing, and a circuit board that is disposed at a rear side of the housing distal from the rotor. Each of the Hall effect sensor modules includes two Hall effect sensing elements, and a plurality of leads. The Hall effect sensor modules output signals when the rotor rotates. The signals are generated corresponding to teeth of the rotor and are indicative of the rotational direction and the rotational speed of the rotor. The Hall effect sensor modules are positioned tangent to the rotor such that the Hall effect sensor modules are spaced apart from each other by a first angle around a circumference of the rotor and the housing is curved. Furthermore, the circuit board is tipped at a second angle to allow the leads of the Hall effect modules to be perpendicular to a plane defined by the circuit board. The conventional sensor assembly is difficult to produce and assemble.

SUMMARY

Therefore, an object of the disclosure is to provide a rotating direction and rotating speed sensing device that can alleviate at least one of the drawbacks of the prior art.

According to the disclosure, the rotating direction and rotating speed sensing device includes a tested unit, a housing and, a Hall effect sensor.

The tested unit includes a base, an output shaft that is perpendicular to the base, and a toothed disk that is sleeved on the output shaft and that is driven by the output shaft.

The housing is disposed on the base, and includes a base portion, a mounting recess that is formed on a front side of the base portion proximate to the toothed disk, and at least one through hole that communicates with the mounting recess and that extends through the base portion.

The Hall effect sensor is disposed in the mounting recess and positionally corresponds to the toothed disk for detecting rotating direction and rotating speed of the output shaft. The Hall effect sensor includes three Hall effect sensing elements, a power supply pin, a first pin, a second pin, and a ground pin. The Hall effect sensing elements are spaced apart along a first straight line. The power supply pin, the first pin, the second pin, and the ground pin extend through the through hole. The Hall effect sensing elements detects the toothed disk and makes the first pin and the second pin respectively output a first signal and a second signal when the toothed disk rotates.

The first straight line cooperates with a tangential direction of the toothed disk at a point thereof closest to the Hall effect sensor to form an included angle that ranges in a predetermined angle range, such that a phase shift between the first signal and the second signal ranges from 45 degrees to 135 degrees when the toothed disk rotates.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
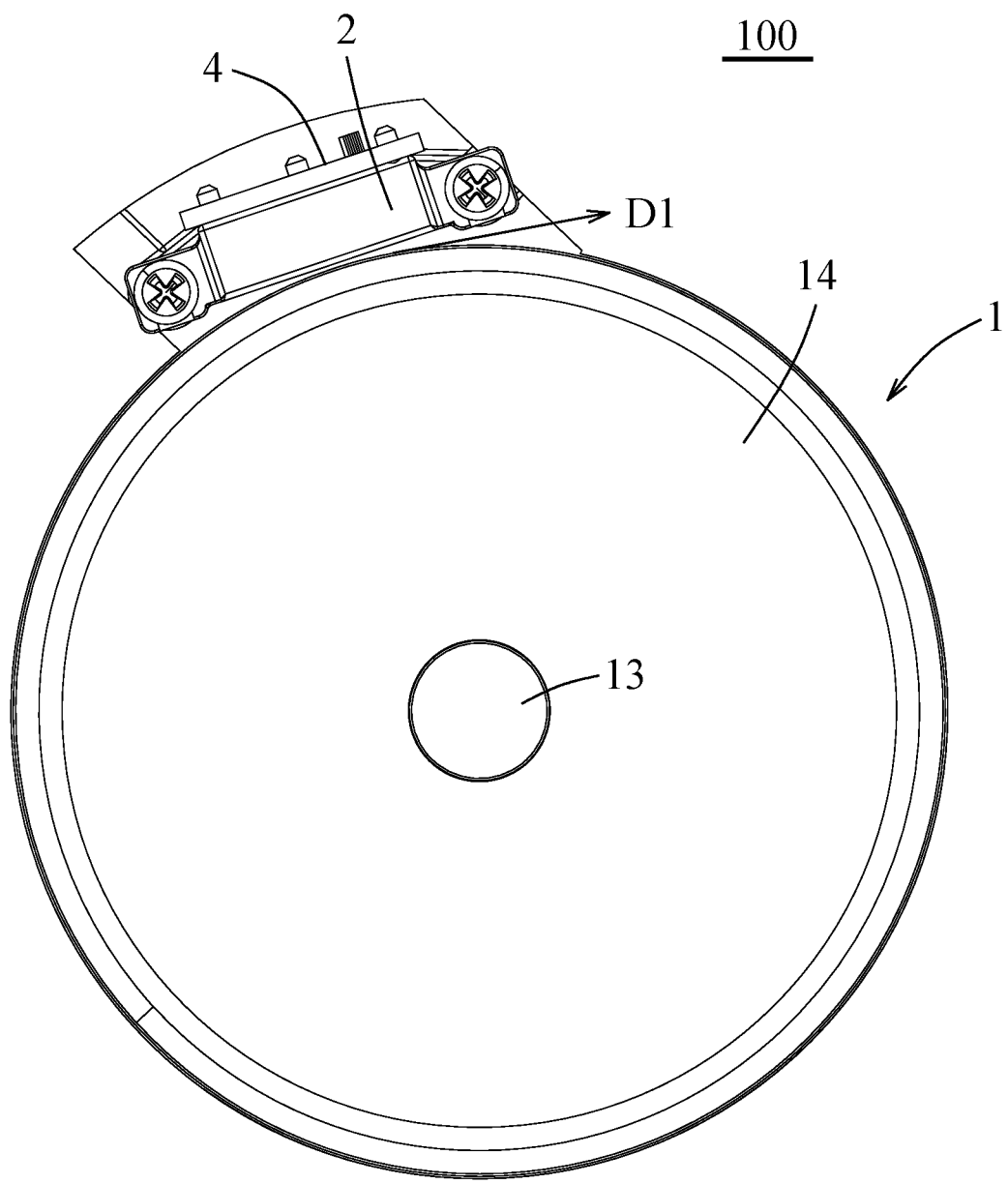
FIG. 1 is a top view illustrating an embodiment of a rotating direction and rotating speed sensing device according to the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
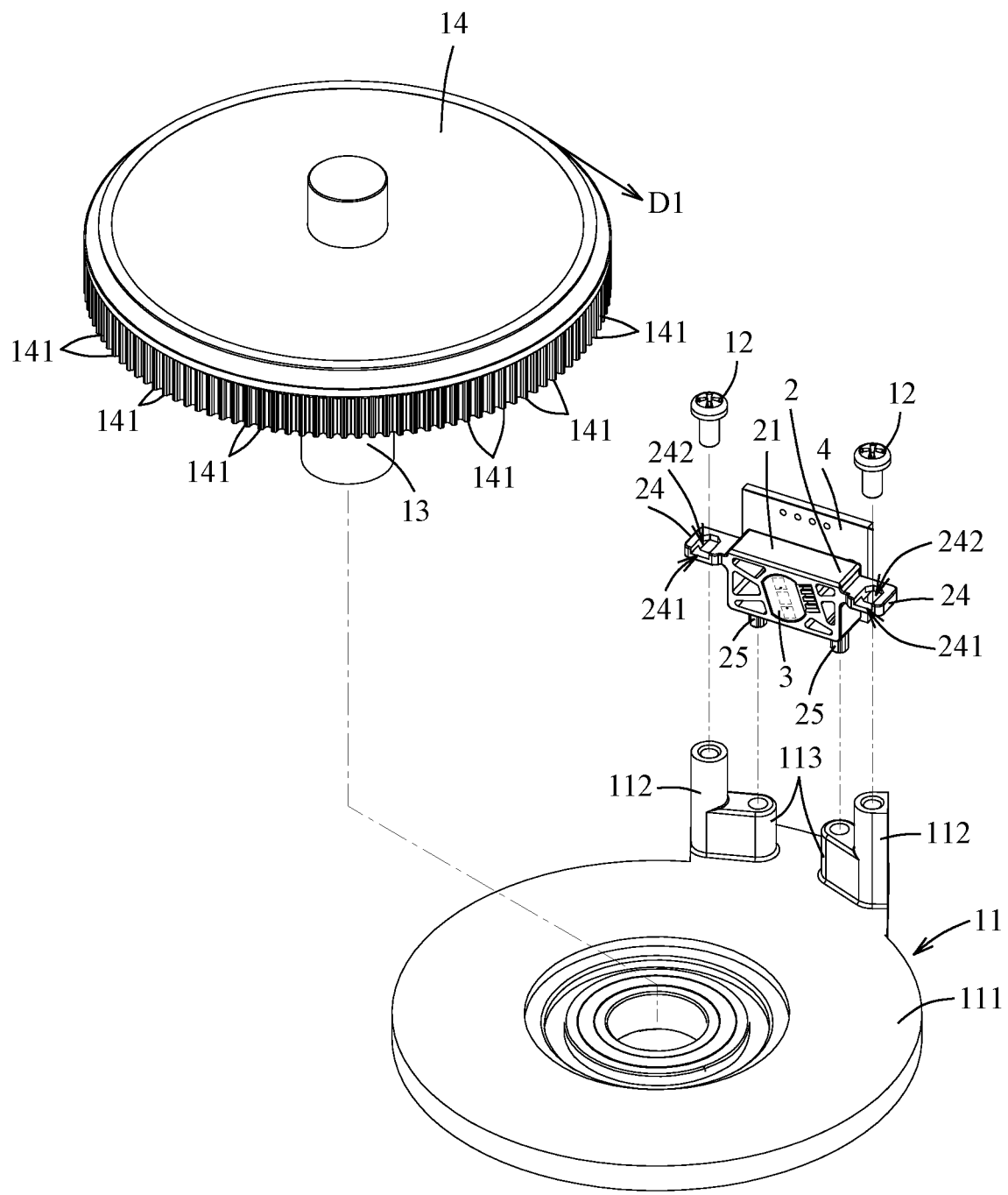
FIG. 2 is an exploded view of the embodiment.

Referring to FIGS. 1 and 2, according to the disclosure, an embodiment of a rotating direction and rotating speed sensing device 100 is mainly to be installed on a vehicle (not shown), and is adapted for detecting rotating speed and rotating direction of a motor of an automatic sliding door or an automatic tailgate of the vehicle. The rotating direction and rotating speed sensing device 100 includes a tested unit 1, a housing 2, a Hall effect sensor 3, and a circuit board 4.

The tested unit 1 includes a base 11, two fasteners 12, an output shaft 13, and a toothed disk 14. The base 11 has a bottom plate portion 111, two first limiting portions 112 that are disposed on the bottom plate portion 111 and that are spaced apart from each other, and two second limiting portions 113 that are disposed on the bottom plate portion 111, that are respectively connected to the first limiting portions 112, and that are lower than the first limiting portions 112. The output shaft 13 is perpendicular to the base 11. The toothed disk 14 is sleeved on the output shaft 13 and is driven by the output shaft 13 to rotate. The toothed disk 14 is made of a magnetically permeable material. In this embodiment, the toothed disk 14 is made of low-carbon steel. The toothed disk 114 has a plurality of teeth 141. In this embodiment, the number of the teeth is 116, but is not limited thereto. Referring to FIGS. 2 to 5, in this embodiment, the housing 2 is made of an engineering plastic by injection molding. The housing 2 includes a base portion 21, an mounting recess 22 that is formed on a front side of the base portion 21 proximate to the toothed disk 14 of the tested unit 1, four through holes 23 that communicate with the mounting recess 22 and that extend through the base portion 21, two ear portions 24 that are respectively formed on left side and right side of the base portion 21, two leg portions 25 that are spaced apart from each other and that extend downwardly from the base portion 21, and three projecting rods 26 that project from a rear side of the base portion 21 distal from the toothed disk 14. Each of the ear portions 24 has an opening 241 and a connecting hole 242 that extends vertically and that communicates with the opening 241. By virtue of the opening 241, the housing 2 may be easily demolded after injection molding. The ear portions 24 positionally correspond to the first limiting portions 112, and the housing 2 is fastened on the base 11 by the fasteners 12 that extend through the connecting holes 242 of the ear portions 24 and the first limiting portions 112. In this embodiment, cross sections of the leg portions 25 are cross-shaped, but are not limited thereto. The leg portions 25 are respectively engaged to the second limiting portions 113.

The Hall effect sensor 3 is disposed in the mounting recess 22 of the housing 2, and positionally corresponds to the toothed disk 14 of the tested unit 1 for detecting rotating direction and rotating speed of the output shaft 13. The Hall effect sensor 3 includes three Hall effect sensing elements 31, a power supply pin 32, a first pin 33, a second pin 34, and a ground pin 35. The Hall effect sensing elements 31 are positioned on a first straight line (L1), and are spaced apart along the first straight line (L1). The power supply pin 32, the first pin 33, the second pin 34, and the ground pin 35 are bent 90 degrees and extend through the through holes 23 of the housing 2. In some variant embodiments, the housing 2 may include only one through hole 23, which may have a rectangular cross section, for the power supply pin 32, the first pin 33, the second pin 34, and the ground pin 35 of the Hall effect sensor 3 to extend therethrough.

The circuit board 4 includes three first holes 41 for the projecting rods 26 of the housing 2 to extend therethrough, and four second holes 42 for the power supply pin 32, the first pin 33, the second pin 34, and the ground pin 35 of the Hall effect sensor 3 to extend therethrough. More specifically, in this embodiment, the projecting rods 26 of the housing 2 extend through the first holes 41 of the circuit board 4 such that the projecting rods 26 are perpendicular to the circuit board 4, and the projecting rods 26 are fixed to the circuit board 4 by hot riveting. Therefore, binding stability between the projecting rods 26 and the circuit board 4 is enhanced, the housing 2 may be prevented from detaching from the circuit board 4, so that stability during use may be enhanced. Furthermore, the power supply pin 32, the first pin 33, the second pin 34, and the ground pin 35 are welded on the circuit board 4, so as to facilitate connecting of an external connector (not shown) to the power supply pin 32, the first pin 33, the second pin 34, and the ground pin 35.

In this embodiment, as an example, a Hall effect sensor purchased from Allegro MicroSystems (model number: ATS605) is used as the Hall effect sensor 3. The Hall effect sensing elements 31 of the Hall effect sensor 3 detects the toothed disk 14 and makes the first pin 33 and the second pin 34 respectively output a first signal and a second signal when the toothed disk 14 rotates. To stably and correctly determine the rotating direction and the rotating speed of the output shaft 13 based on the first signal and the second signal, a phase shift between the first signal and the second signal ranges from 45 degrees to 135 degrees when the toothed disk 14 rotates. In a specific example, the phase shift between the first signal and the second signal is 90 degrees, which indicates that the first signal and the second signal are in quadrature, so that the tolerance of phase drifting is highest. When the toothed disk 14 rotates in a forward direction, the first signal leads the second signal; when the toothed disk 14 rotates in a reverse direction, the first signal lags the second signal. Furthermore, the Hall effect sensing elements 31 are located between a first imaginary plane and a second imaginary plane in which an upper surface and a bottom surface of the toothed disk 14 respectively reside, thereby improving accuracy of the Hall effect sensor 3. To make the phase shift between the first signal and the second signal ranges from 45 degrees to 135 degrees, the Hall effect sensor 3 is mounted in the mounting recess 22 with a predetermined angle such that the first straight line (L1) cooperates with a tangential direction (D1) of the toothed disk 14 at a point thereof closest to the Hall effect sensor 3 to form an included angle (θ) that ranges in a predetermined angle range. The tangential direction (D1) is perpendicular to a rotation axis of the output shaft 13.

Figure 3:
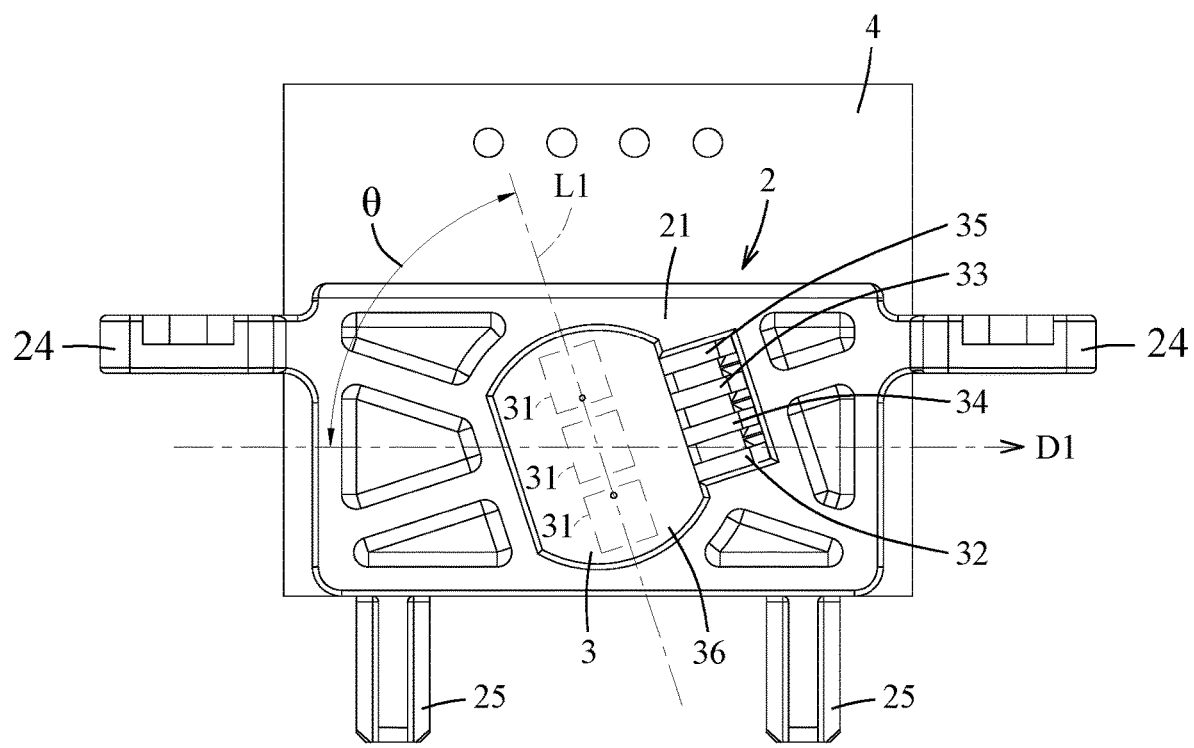
FIG. 3 is a front view of a housing, a Hall effect sensor, and a circuit board of the embodiment.
Figure 4:
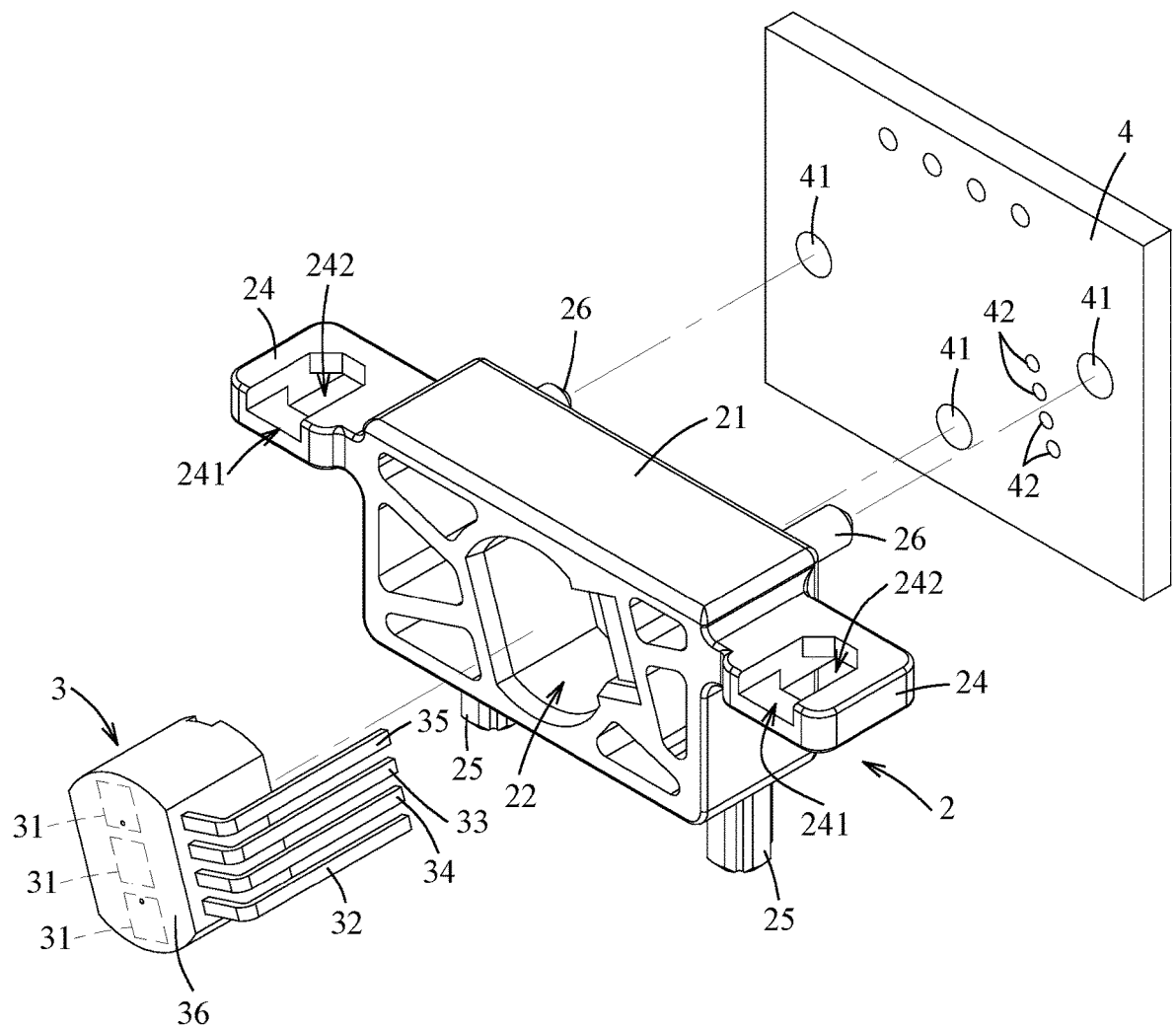
FIG. 4 is an exploded perspective view of FIG. 3.
Figure 5:
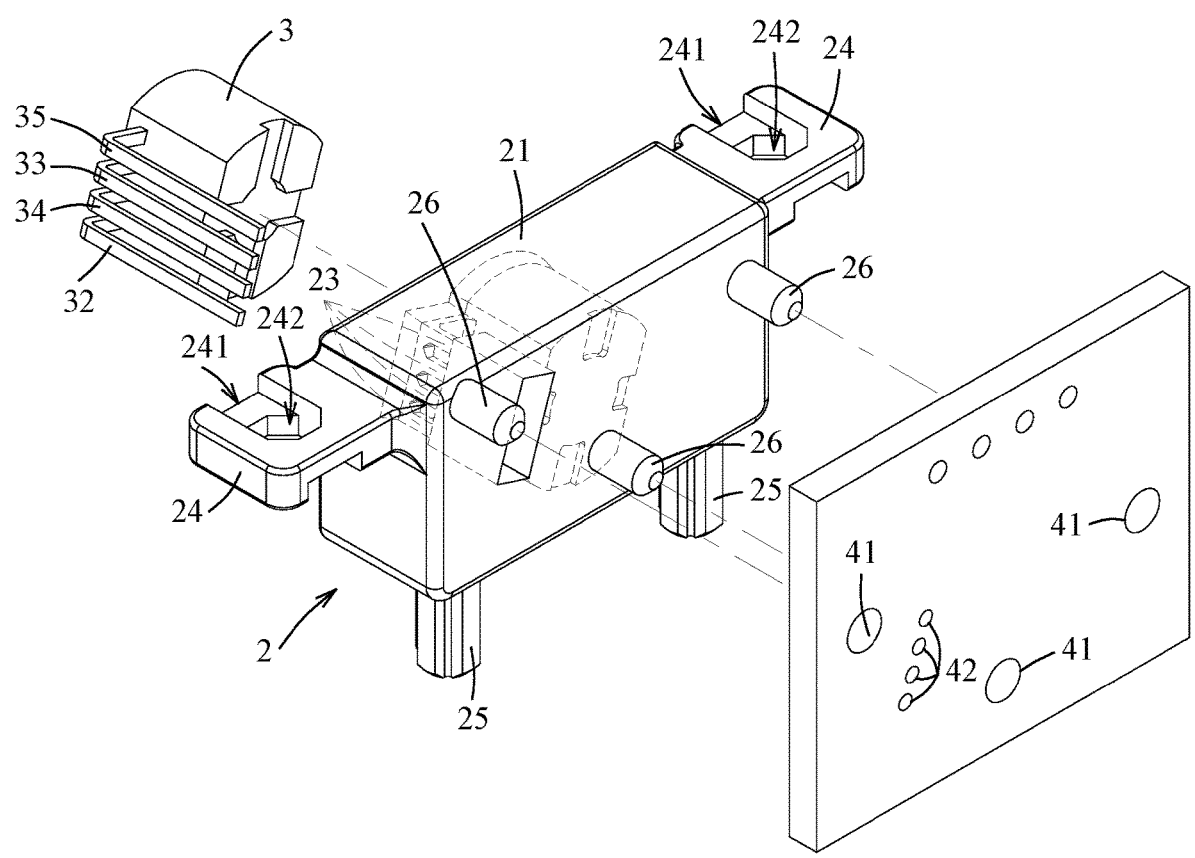
FIG. 5 is an exploded perspective view of FIG. 3 taken from another angle.
Figure 6:
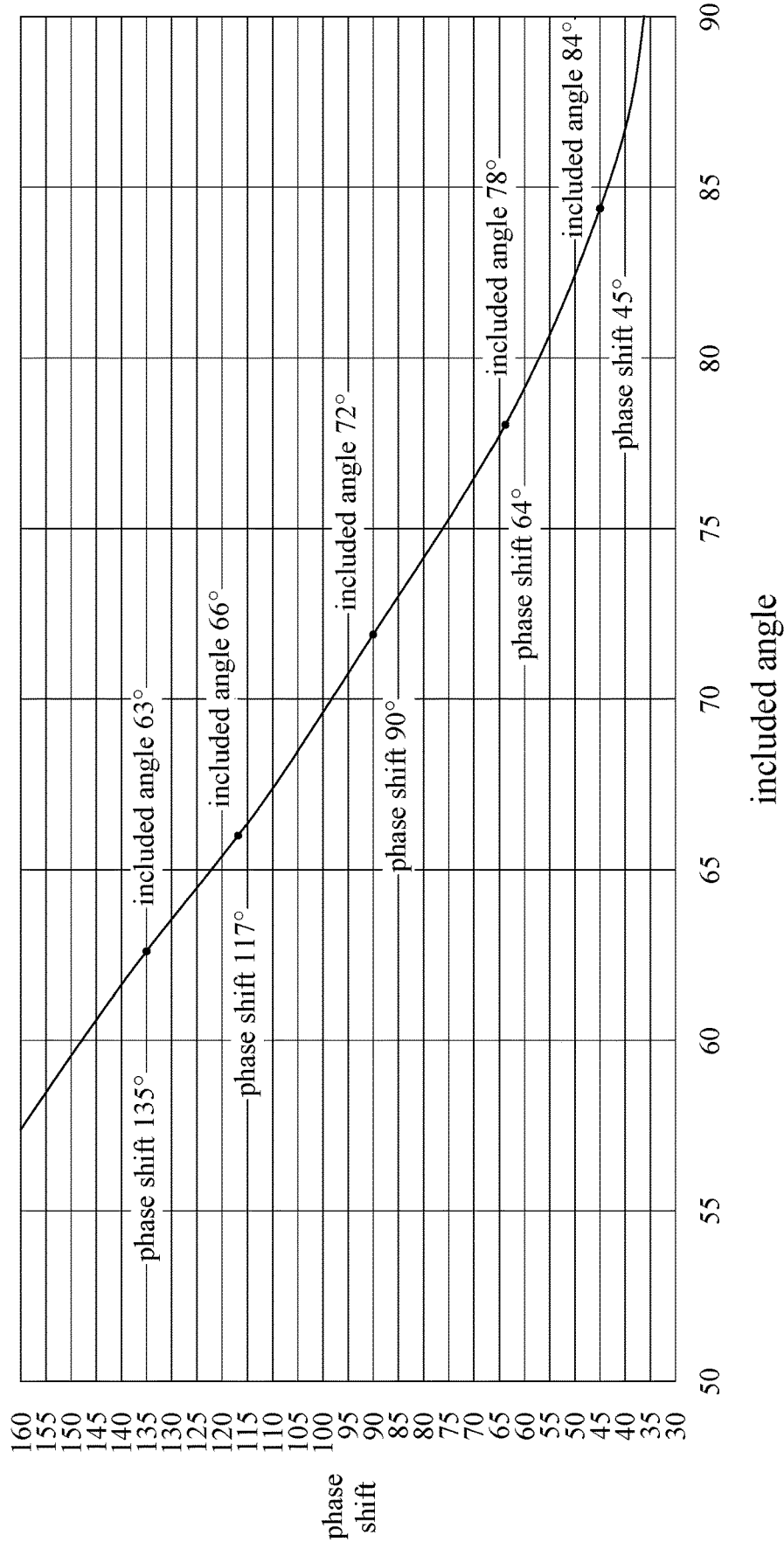
FIG. 6 is an experimental data chart, showing a relationship between an included angle and a phase shift of the embodiment.

Referring to FIGS. 2, 3, and 6, according to the experimental data of FIG. 6, when the included angle (θ) between the first straight line (L1) and the tangential direction (D1) ranges from 63 degrees to 84 degrees, the phase shift between the first signal and the second signal ranges from 45 degrees to 135 degrees. Specifically, as shown in FIG. 6, when the included angle (θ) is 63 degrees, 66 degrees, 72 degrees, 78 degrees, and 84 degrees, the phase shift is 135 degrees, 117 degrees, 90 degrees, 64 degrees, and 45 degrees, respectively. That is to say, in the specific example where the phase shift is 90 degrees, the included angle (θ) is 72 degrees.

Figure 7:
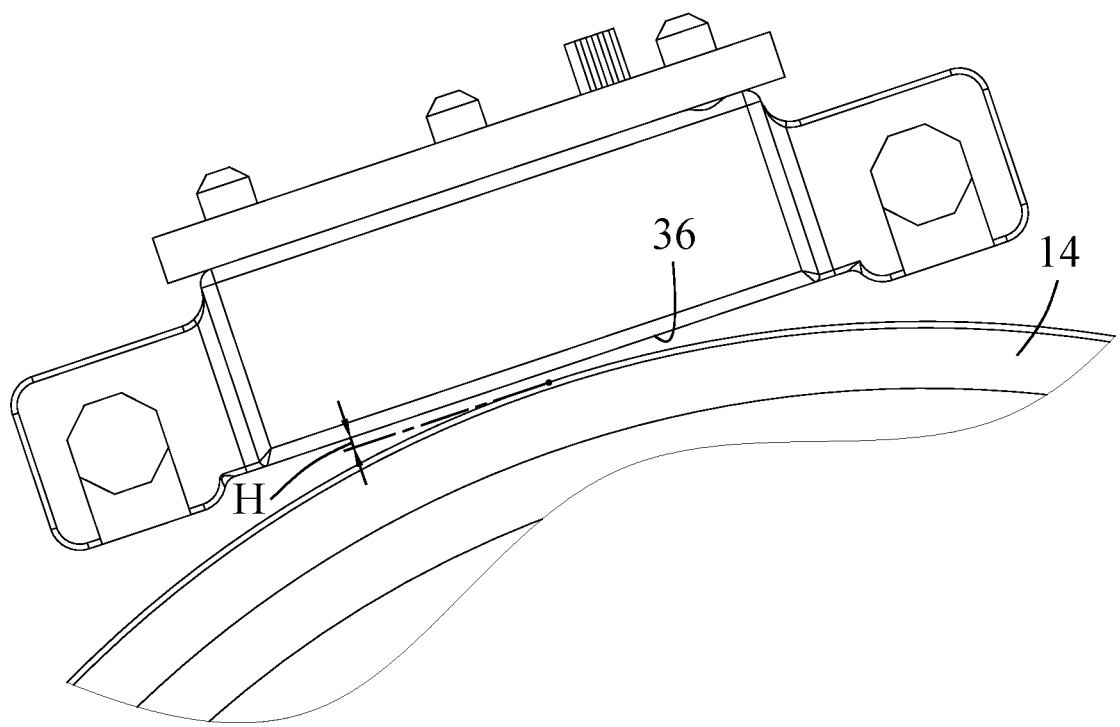
FIG. 7 is an enlarged top view, illustrating an air gap between a sensing surface of the Hall effect sensor and a toothed disk of a tested unit of the embodiment.

Referring to FIGS. 2, 3, and 7, the Hall effect sensor 3 has a sensing surface 36 that faces the toothed disk 14, and an air gap (H) between the sensing surface 36 of the Hall effect sensor 3 and the point of the toothed disk 14 closest to the Hall effect sensor 3 is not greater than 0.99 millimeters. In addition, the sensing surface 36 of the Hall effect sensor 3 is parallel to the tangential direction (D1) of the toothed disk 14 at the point thereof closest to the Hall effect sensor 3, so that the Hall effect sensor 3 may detect changes in magnetic field stably and output signals stably.

In addition, compared to the conventional motor speed sensor assembly, the rotating direction and rotating speed sensing device 100 of the disclosure may only include one Hall effect sensor 3 such that the housing 2 does not have to be curved. Furthermore, the circuit board 4 may not be tipped, so that the power supply pin 32, the first pin 33, the second pin 34, and the ground pin 35 are perpendicular to the circuit board 4.

In summary, the rotating direction and rotating speed sensing device 100 may only include one Hall effect sensor 3 that is mounted in the mounting recess 22 with the predetermined angle such that the included angle (θ) formed between the first straight line (L1), on which the Hall effect sensing elements 31 of the Hall effect sensor 3 are positioned, and the tangential direction (D1) of the toothed disk 14 at the point thereof closest to the Hall effect sensor 3, ranges from 63 degrees to 84 degrees, and the phase shift between the first signal and the second signal ranges from 45 degrees to 135 degrees when the toothed disk 14 rotates. Therefore, the rotating direction and rotating speed sensing device 100 can obtain the rotating direction and the rotating speed of the output shaft 13 based on the first signal and the second signal by using only one Hall effect sensor. With respect to the rotating direction and rotating speed sensing device 100 of the disclosure, the assembling process is simplified, the production efficiency is increased, the volume and the weight are reduced, the maintenance is easier, so the object of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotating direction and rotating speed sensing device, comprising:
    a tested unit including a base, an output shaft that is perpendicular to the base, and a toothed disk that is sleeved on the output shaft and that is driven by the output shaft;
    a housing disposed on the base, and including a base portion, a mounting recess that is formed on a front side of the base portion proximate to the toothed disk, and four through holes that communicate with the mounting recess and that extend through the base portion; and
    a Hall effect sensor disposed in the mounting recess and positionally corresponding to the toothed disk for detecting rotating direction and rotating speed of the output shaft, the Hall effect sensor including three Hall effect sensing elements, a power supply pin, a first pin, a second pin, and a ground pin, the Hall effect sensing elements being spaced apart along a first straight line, the power supply pin, the first pin, the second pin, and the ground pin extending respectively through the through holes, the Hall effect sensing elements detecting the toothed disk and making the first pin and the second pin respectively output a first signal and a second signal when the toothed disk rotates;
    wherein the first straight line cooperates with a tangential direction of the toothed disk at a point thereof closest to the Hall effect sensor to form an included angle that ranges in a predetermined angle range, such that a phase shift between the first signal and the second signal ranges from 45 degrees to 135 degrees when the toothed disk rotates;
    wherein the included angle between the first straight line and the tangential direction ranges from 63 degrees to 84 degrees; and
    wherein the rotating direction and rotating speed sensing device further comprises a circuit board, the Hall effect sensor having a sensing surface that faces the toothed disk, the circuit board being parallel to the sensing surface.

2. The rotating direction and rotating speed sensing device as claimed in claim 1, wherein when the included angle is 72 degrees, the phase shift between the first signal and the second signal is 90 degrees.

3. The rotating direction and rotating speed sensing device as claimed in claim 1, wherein the housing further includes a plurality of projecting rods projecting from a rear side of the base portion distal from the toothed disk, the circuit board including a plurality of first holes for the projecting rods to extend therethrough, and four second holes for the power supply pin, the first pin, the second pin, and the ground pin to extend therethrough.

4. The rotating direction and rotating speed sensing device as claimed in claim 1, wherein an air gap between the sensing surface and the toothed disk is not greater than 0.99 millimeters.

5. The rotating direction and rotating speed sensing device as claimed in claim 1, wherein the Hall effect sensing elements are located between a first imaginary plane and a second imaginary plane in which an upper surface and a bottom surface of the toothed disk respectively reside.

* * * * *